(12) United States Patent
Tresch et al.

(10) Patent No.: US 6,903,197 B2
(45) Date of Patent: *Jun. 7, 2005

(54) AZOXY DYES AND COPPER COMPLEXES THEREOF

(75) Inventors: Rainer Tresch, Maxdorf (DE); Karl-Heinz Etzbach, Frankenthal (DE); Rüdiger Sens, Ludwigshafen (DE); Claudia Kräh, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/795,585

(22) Filed: Mar. 9, 2004

(65) Prior Publication Data

US 2004/0204570 A1 Oct. 14, 2004

Related U.S. Application Data

(63) Continuation of application No. 09/936,432, filed as application No. PCT/EP00/01636 on Feb. 28, 2000, now Pat. No. 6,727,351.

(30) Foreign Application Priority Data

Mar. 13, 1999 (DE) ........................................ 199 11 267

(51) Int. Cl.[7] .............................................. C09B 43/10
(52) U.S. Cl. ........................ 534/569; 534/570; 534/572
(58) Field of Search ................................ 534/569, 570, 534/572

(56) References Cited

U.S. PATENT DOCUMENTS

| | | | |
|---|---|---|---|
| 2,180,776 A | 11/1939 | Straub et al. | |
| 2,203,196 A | 6/1940 | Hanhart | |
| 4,515,599 A | 5/1985 | Kaeser | |
| 5,609,796 A | 3/1997 | Yamamoto et al. | |

FOREIGN PATENT DOCUMENTS

| | | |
|---|---|---|
| CH | 172368 | 12/1934 |
| CH | 193343 | 1/1938 |
| CH | 196252 | 6/1938 |
| CH | 196259 | 6/1938 |
| CH | 196260 | 6/1938 |
| CH | 196264 | 6/1938 |
| DE | 26 51 369 | 6/1977 |
| DE | 28 44 597 | 4/1980 |
| EP | 0 043 792 | 1/1982 |
| EP | 0 051 785 | 5/1982 |
| EP | 0 648 814 | 4/1995 |
| GB | 2 034 344 | 6/1980 |

Primary Examiner—Fiona T. Powers
(74) Attorney, Agent, or Firm—Oblon, Spivak, McClelland, Maier & Neustadt, P.C.

(57) ABSTRACT

Azoxy dyes of the general formula I in the form of the free acid

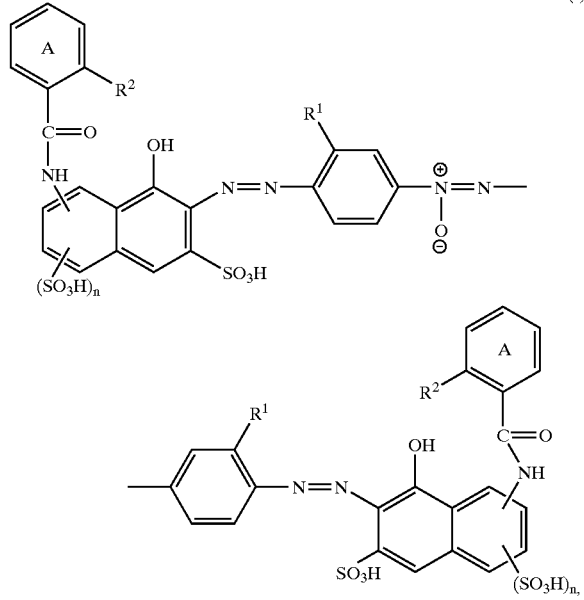

where
n is 0 or 1, each
R[1] is selected from the group consisting of methoxy, hydroxyl and carboxyl, each
R[2] is selected from the group consisting of carboxyl, amino, $C_1$–$C_4$-alkylamino, allylamino, benzylamino and methoxycarbonylmethylamino, and the phenyl rings A may additionally be substituted by $C_1$–$C_8$-alkyl, unsubstituted or methyl- or halogen-substituted phenyl, hydroxyl, amino, nitro, halogen, carboxyl, N-benzylcarbamoyl, unsubstituted or nitro-, halogen-, $C_1$–$C_4$-alkoxy- or acetoxy-substituted phenylcarbamoyl and naphthylcarbamoyl or be benzofused, their copper complexes, a process for preparing the copper complex dyes, azoxy dyes of the formula I in their partially or completely deacylated form, their copper complexes, colorants comprising these azoxy dyes and/or their copper complexes and also their use for dyeing and printing natural or synthetic substrates.

10 Claims, No Drawings

AZOXY DYES AND COPPER COMPLEXES THEREOF

This is a continuation application of U.S. application Ser. No. 09/936,432 filed on Sep. 13, 2001 now U.S. Pat. No. 6,727,351 B1.

The present invention relates to novel azoxy dyes of the general formula I in the form of the free acid

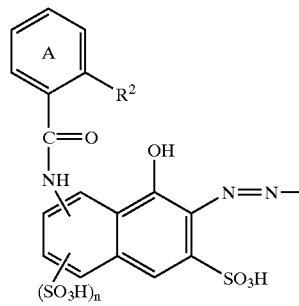

(I)

where n is 0 or 1, each $R^1$ is selected from the group consisting of methoxy, hydroxyl and carboxyl, each $R^2$ is selected from the group consisting of carboxyl, amino, $C_1$–$C_4$-alkylamino, allylamino, benzylamino and methoxycarbonylmethylamino, and the phenyl rings A may additionally be substituted by $C_1$–$C_8$-alkyl, unsubstituted or methyl- or halogen-substituted phenyl, hydroxyl, amino, nitro, halogen, carboxyl, N-benzylcarbamoyl, unsubstituted or nitro-, halogen-, $C_1$–$C_4$-alkoxy- or acetoxy-substituted phenylcarbamoyl and naphthylcarbamoyl or be benzofused, their copper complexes, a process for preparing the copper complex dyes, azoxy dyes of the formula I in their partially or completely deacylated form, their copper complexes, colorants comprising these azoxy dyes and/or their copper complexes and their use for dyeing and printing natural or synthetic substrates.

CH-A-193 343, CH-A-196 252, CH-A-196 259, CH-A-196 260, CH-A-196 264, DE-A-26 51 369, EP-A-648 814 and EP-A-43 792 describe azoxy dyes containing various hydroxyaminonaphthalenesulfonic acids and their copper complexes.

DE-A-28 44 597 teaches a process for preparing copper-containing azoxy dyes whose coupling component is a 4-hydroxy-6-sulfophenylaminonaphthalene-2-sulfonic acid.

The prior art dyes are dull and frequently provide unlevel dyeings.

It is an object of the present invention to provide dyes which do not have the abovementioned disadvantages and which possess good application properties.

We have found that this object is achieved by the above-described dyes and their copper complexes.

Any alkyl appearing in the abovementioned formula may be straight-chain or branched.

Additionally substituted phenyl rings A may each bear 1, 2, 3 or 4, preferably 1 or 2, substituents, which may be different.

Halogen is fluorine, chlorine, bromine or iodine.

$R^2$ is for example methylamino, ethylamino, propylamino, isopropylamino, butylamino, isobutylamino, sec-butylamino and tert-butylamino.

Substituents for the phenyl rings A include for example methyl, ethyl, propyl, isopropyl, butyl, sec-butyl, tert-butyl, pentyl, hexyl, heptyl, octyl, 2-, 3- or 4-bromophenyl, 2-, 3- or 4-methylphenyl, 2-, 3- or 4-nitrophenylcarbamoyl, 2-, 3- or 4-methoxyphenylcarbamoyl, 2-methoxy-4-nitro- and 2-methoxy-5-nitrophenylcarbamoyl, 2-, 3- or 4-ethoxyphenylcarbamoyl and 2-, 3- or 4-acetoxyphenylcarbamoyl.

In the description part and in the claims, the dyes of the formulae I, VI, VII, VIII and IX are depicted in the form of the free acids, but preferably they are present as salts, especially as alkali metal salts, and are isolated as salts from the synthesis. The formula depiction as free acid must therefore, as customary in the dye literature, be considered equivalent to the depiction as salt.

Suitable cations are derived from metal or ammonium ions. Metal ions are in particular the lithium, sodium or potassium ions. Ammonium ions for the purposes of the present invention are unsubstituted or substituted ammonium cations. Substituted ammonium cations include for example monoalkyl-, dialkyl-, trialkyl-, tetraalkyl- or benzyltrialkyl-ammonium cations for example diethanolammonium or cations derived from nitrogenous five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is here to be understood as meaning in general straight-chain or branched $C_1$–$C_{20}$-alkyl, which may be substituted by 1 or 2 hydroxyl groups and/or interrupted by from 1 to 4 oxygen atoms in ether function.

The dyes may be prepared by reacting an aminohydroxynaphthalenesulfonic acid of the formula II

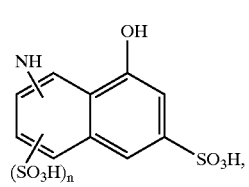

(II)

where n is 0 or 1, with an anhydride of the formula III

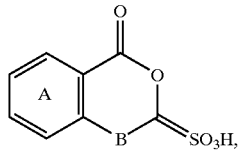
(III)

where B is a single bond or imino, $C_1$–$C_4$-alkylimino or phenylimino and A is as defined above, in a weakly alkaline medium to form a coupling component of the formula IV

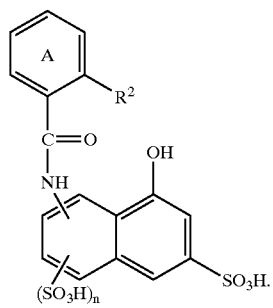
(IV)

This coupling component may be coupled with nitroanilines of the formula V

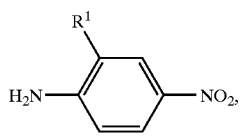
(V)

where $R^1$ is as defined above, as diazo component in a conventional manner before two resultant nitromonoazo dyes are reductively linked via an azoxy bridge to form the dyes of the invention.

The reducing agents used are preferably reducing sugars, for example D-glucose, in aqueous alkaline solution. The solution may be rendered alkaline for example by means of an alkali metal hydroxide such as sodium hydroxide or lithium hydroxide. Such reductions are common knowledge and described for example in EP-A-43 792. In addition, a reduction with customary reducing agents such as aldehydes e.g. formaldehyde or hydrazine hydrate is possible.

Suitable aminohydroxynaphthalenesulfonic acids II include for example 1-amino-8-hydroxynaphthalene-4,6-disulfonic acid, 2-amino-8-hydroxynaphthalene-6-sulfonic acid, 3-amino-8-hydroxynaphthalene-6-sulfonic acid, 4-amino-8-hydroxynaphthalene-6-sulfonic acid and particularly preferably 1-amino-8-hydroxynaphthalene-3,6-disulfonic acid.

Examples of anhydrides III are
phthalic anhydrides such as phthalic anhydride, 3-methyl-, 4-methyl-, 3,6-dimethyl-, 4-tert-butyl-, 3,4,5,6-tetramethyl-, 3-o-tolyl-, 3,6-diphenyl-, 3-hydroxy-, 4-carboxy-, 3-amino-, 3-nitro-, 4-nitro-4-(2,4-dichlorophenyl)carbamoyl-, 4-(3,4-dichlorophenyl)carbamoyl-, 4-(2-methoxy-5-chlorophenyl)carbamoyl-, 4-(3-nitrophenyl)carbamoyl-, 4-(2-methoxy-4-nitrophenyl)carbamoyl-, 4-(2-methoxy-5-nitrophenyl)carbamoyl, 4-(4-acetamidophenyl)carbamoyl-, 4-(2-ethoxyphenyl)carbamoyl-, 4-naphthylcarbamoyl-, 4-benzylcarbamoyl-, 3-fluoro-, 4-fluoro-, 3,4,5,6-tetrafluoro-, 3,6-difluoro-, 3,4-difluoro-, 3-chloro-, 4-chloro-, 3,6-dichloro-, 4,5-dichloro-, 3,4,5,6-tetrachloro-, 4-bromo-, 3,4,5,6-tetrabromo-, 3,4,5,6-tetraiodo- and 3-(4-bromo)phenyl-phthalic anhydride, isatoic anhydrides such as isatoic anhydride, 6-methyl-, 6-hydroxy-, 5-hydroxy-, 4-carboxy-, 4-nitro-, 5-nitro-, 5-amino-, 6-fluoro-, 5-chloro-, 6-chloro-, 3,5-dichloro-, 5-bromo-, N-methyl-, N-ethyl-, N-benzyl-, N-allyl-, N-methyl-5-nitro-, N-methyl-5-chloro-, N-methyl-6-chloro- and N-methoxycarbamoylmethyl-isatoic anhydride, and also naphthalene-1,2-dicarboxylic and naphthalene-2,3-dicarboxylic anhydrides.

The present invention further provides copper complex dyes and their mixtures which are obtainable by reacting dyes I with at least 0.1 mol equivalent of a copper donor. Preferably, 0.1–2 mol of a copper donor is used per mole of dye. Amounts above 2 mol equivalents are possible, but have no influence on the product. Incomplete formation of 2:1 complexes, i.e., the use of <2 mol equivalents of the copper donors, provides mixtures of the uncomplexed, singly copper-complexed and doubly copper-complexed dyes.

The copper complex dyes conform to the general formula VI in the form of the free acid

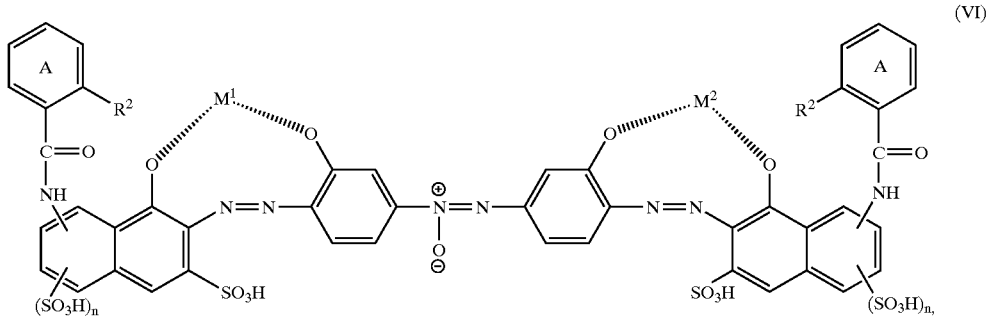
(VI)

where at least one of $M^1$ and $M^2$ is copper(II) and any which is not is hydrogen and methyl, and n, $R^2$ and A are each as defined above. When $M^1$ or $M^2$ is hydrogen and methyl, the methyl radical will form the methoxy group on the phenyl ring and the hydrogen will form the hydroxyl group on the naphthalene structure.

Copper complex dyes obtained by reaction with 0.5–1.7 mol, especially 0.5–1.5 mol, of copper donor per mole of dye are preferred.

The copper donors used may be salts which contain the copper as cation, for example copper sulfate, copper chloride or copper acetate. In some cases, the use of complex copper compounds is of advantage, for example in the form of copper-ammine complexes, such as coppertetrammine sulfates from copper sulfate and ammonia, pyridine or monoethanolamine, or in the form of compounds which contain the copper in complexed form, for example complex copper compounds of the alkali metal salts of aliphatic aminocarboxylic acids or hydroxycarboxylic acids, as of glycocoll, of lactic acid and in particular of tartaric acid, such as sodium copper tartrate.

The treatment with the copper donor takes place in an aqueous or organic/aqueous medium, for example at room temperature, if readily metallizable starting compounds are present, or by heating to 50–120° C. in an open vessel, for example under reflux, or if necessary in a closed vessel under superatmospheric pressure, the pH conditions being determined by the nature of the metallization method chosen.

If desired, solvents, for example alcohol, dimethylformamide, etc., can also be added during the metallization.

Preference is given to dyes of the general formula VII in the form of the free acid Preference is further given to dyes I where each $R^1$ is methoxy and to the copper complexes obtainable therefrom.

Preference is also given to dyes I and their copper complexes where the phenyl rings A are unsubstituted, i.e., bear the $R^2$ only, or $C_1$–$C_4$-alkyl-substituted.

Preference is given to the dyes I and VII and their copper complexes where each $R^2$ is carboxyl.

Preference is given in particular to dyes I and VII where $R^1$ is methoxy, $R^2$ is carboxyl and the phenyl rings A bear $C_1$–$C_4$-alkyl as further substituents or preferably are unsubstituted. The copper complexes obtainable therefrom are preferred in particular.

Preference is given in particular to the copper complex mixture of the preferred dyes which are obtained by reaction with 0.1–2, especially 0.5–1.7, mol equivalents of a copper donor.

The present invention further provides azoxy dyes of the general formula VIII in the form of the free acid

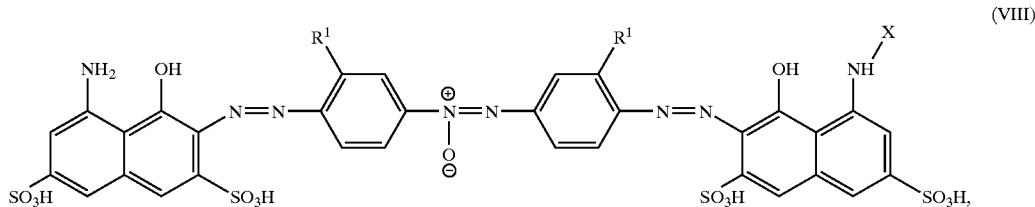

(VIII)

where X is hydrogen or a radical of the formula

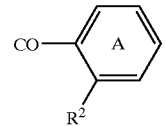

and $R^1$, $R^2$ and A are each as defined above.

The present invention further provides copper complex dyes of the general formula IX in the form of the free acid

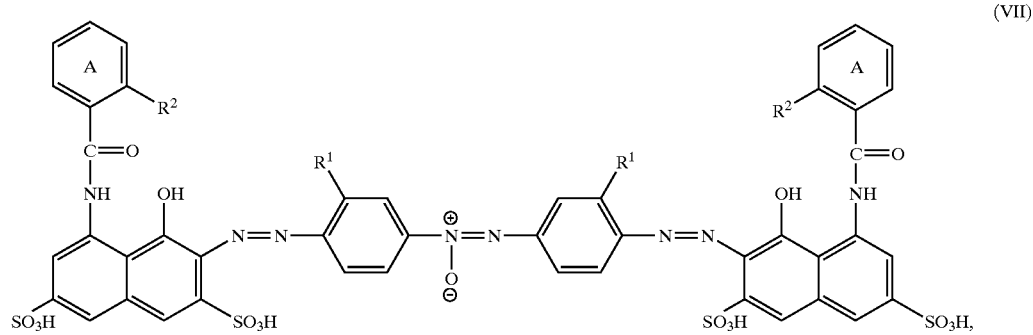

(VII)

where $R^1$, $R^2$ and A are each as defined above, and their copper complexes.

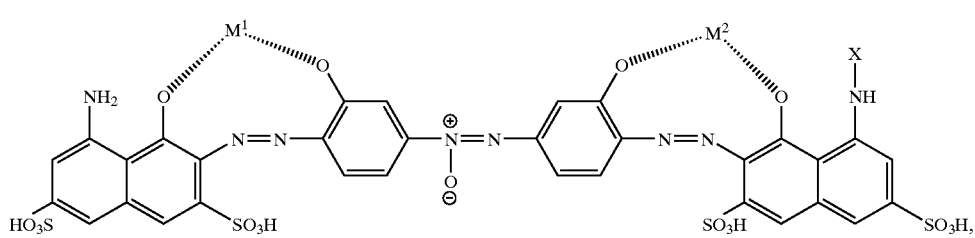

(IX)

where M1, M2 and X are each as defined above.

Preference is given to azoxy dyes of formula VIII in the form of the free acid where X is hydrogen.

Preference is further given to copper complex dyes of formula IX in the form of the free acid where X is hydrogen.

The azoxy dyes of the formula VIII are obtained as described above for the azoxy dyes of the formula I. The partial or complete detachment of the radical

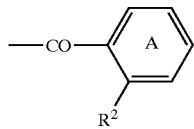

(deacylation) can be effected by controlling the pH after the reduction of the nitromonoazo dyes to the azoxy compound. Working in aqueous solution at a pH below 9 practically provides for complete deacylation to the azoxy dyes of the formula VIII (X=hydrogen).

The dye of the formula X

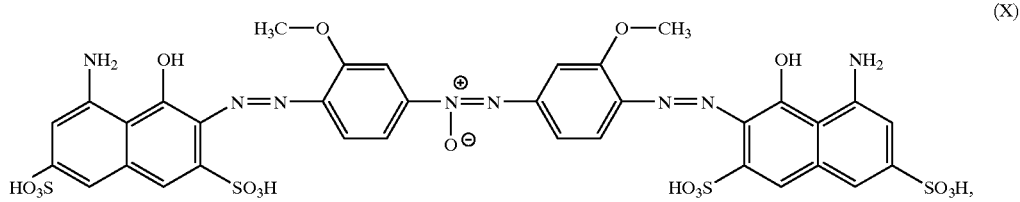

(X)

is formally known from EP-A-648 814, where it is described in Example 3. However, it has been determined that, when this example is repeated, the monoazo dye of the formula XI

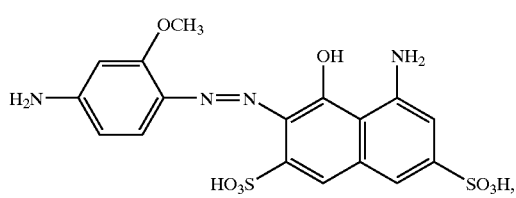

(XI)

is obtained instead of the abovementioned dye X.

The metal complex dyes of the invention can be used alone, in mixtures with each or one another and with the azoxy dyes I and VIII and together with other cationic or anionic compounds in the form of their solutions or in the form of powders or granules.

Dye preparations comprising the novel dyes of the formula I, VII, VIII and/or IX preferably further comprise polymers, such as polyvinylamines, polyvinylamides, polyvinyl acetates, polyvinyl alcohols, polyvinylpyrrolidones or copolymers of the respective monomers. Similarly, oligomers of ethyleneimine, ethylene oxide or propylene oxide or derivatives thereof may be used. Further preferred additives are glycols such as 1,2-glycol, 1,2-propanediol, 2,3-butylene glycol, diethylene glycol, triethylene glycol, ethyltetraglycol, dipropylene glycol, ethylene glycol monopropyl ether, methyldiglycol, triethylene glycol monobutyl ether, triethylene glycol monopropyl ether, diethylene glycol monoethyl ether, diethylene glycol dibutyl ether and particularly preferably urea.

They are very useful for dyeing or printing polymeric material, especially papery materials such as paper and paperboard, but also cellulose, cotton, leather, bast fibers, hemp, flax, sisal, jute, coir, straw or anionically modified fibers and also in recording fluids such as inks especially for ink-jet or printing inks.

The dyes of the invention are particularly useful in the production of pulp-dyed, sized and unsized paper. They are likewise useful for dyeing paper by the pulp method.

Paper, leather and cellulose are dyed in a conventional manner.

The copper complex dyes of the invention provide different bright blues. They have very good affinity for paper. The novel dyes and their preparations color the papermaking wastewater only minimally, if at all, which is particularly favorable from the aspect of keeping the water courses clean. They are substantive, do not marble on paper and are substantially pH-insensitive. Dyeings on paper are notable for good lightfastness. On prolonged exposure to light the hue changes on-tone.

The dyed papers, which exhibit good bleachability, are wetfast, not only with regard to water, but also with regard to milk, soapy water, sodium chloride solutions, fruit juices or sweetened mineral water, and are also stable to alcoholic drinks because of their good alcoholfastness.

The novel dyes can also be used for dyeing, padding or printing polyacrylonitrile textiles or anionically modified polyamide or polyester textiles.

The Examples which follow illustrate the invention.
Preparation of Coupling Components

EXAMPLE 1

34.1 g of the monosodium salt of 1-amino-8-hydroxynaphthalene-3,6-disulfonic acid were introduced into 250 g of water. A pH of 7–8 was set with 10% strength by eight sodium hydroxide solution. 19.3 g of phthalic anhydride ere then added at 20–25° C., and 10% strength by weight sodium hydroxide solution was used to maintain the pH within the range from 7 to 8 during the subsequent stirring time of 3 h as well. The completeness of the conversion of the 1-amino-8-hydroxynaphthalene-3,6-disulfonic acid was verified by means of thin layer chromatography. The coupling component solution thus prepared was used for dye synthesis without intermediate isolation.

EXAMPLE 2

34.1 g of the monosodium salt of 1-amino-8-hydroxynaphthalene-3,6-disulfonic acid were introduced into 300 g of water. A pH of 6–8 was set with 10% strength by weight sodium carbonate solution. 18 g of isatoic anhydride were then added at 20–30° C., and. 10% strength by weight sodium carbonate solution was used to maintain the pH within the range from 6 to 8 during the subsequent stirring time overnight as well. The completeness of the conversion of the 1-amino-8-hydroxynaphthalene-3,6-disulfonic acid was verified by means of thin layer chromatography. The coupling component solution thus prepared was used for dye synthesis without intermediate isolation.

EXAMPLE 3

34.1 g of the monosodium salt of 1-amino-8-hydroxynaphthalene-3,6-disulfonic acid were introduced into 200 g of water. A pH of 7–9 was set with 25% strength by weight potassium hydroxide solution. 26.5 g of 4-tert-butylphthalic anhydride were then added at 20–25° C., and 25% strength by weight potassium hydroxide solution was used to maintain the pH within the range from 7 to 9 during the subsequent stirring time of 4 h as well. The completeness of the conversion of the 1-amino-8-hydroxynaphthalene-3, 6-disulfonic acid was verified by means of thin layer chromatography. The coupling component solution thus prepared was used for dye synthesis without intermediate isolation.

EXAMPLE 4

34.1 g of the monosodium salt of 1-amino-8-hydroxynaphthalene-3,6-disulfonic acid were introduced into 250 g of water. A pH of 7–8 was set with 10% strength by weight sodium hydroxide solution. 30.9 g of N-methoxycarbonylmethylisatoic anhydride were then added at 20–25° C., and 10% strength by weight sodium hydroxide solution was used to maintain the pH within the range from 7 to 8 during the subsequent stirring time of 3 h as well. The completeness of the conversion of the 1-amino-8-hydroxynaphthalene-3,6-disulfonic acid was verified by means of thin layer chromatography. The coupling component solution thus prepared was used for dye synthesis without intermediate isolation.

EXAMPLE 5

23.9 g of 3-amino-8-hydroxynaphthalene-6-sulfonic acid were introduced into 300 g of water. A pH of 7–8 was set with 10% strength by weight sodium hydroxide solution. 20.8 g of phthalic anhydride were then added at 20–25° C., and 10% strength by weight sodium hydroxide solution was used to maintain the pH within the range from 7 to 8 during the subsequent stirring time overnight as well. The completeness of the conversion of the 3-amino-8-hydroxynaphthalene-6-sulfonic acid was verified by means of thin layer chromatography. The coupling component solution thus prepared was used for dye synthesis without intermediate isolation.

Examples 1–5 are repeated with 1-amino-8-hydroxynaphthalene-3,6-disulfonic acid, 3-amino-8-hydroxynaphthalene-6-sulfonic acid and 1-amino-8-hydroxynaphthalene-4,6-disulfonic acid to prepare the coupling components of the general formulae Va, Vb and Vc mentioned in Table 1.

TABLE 1

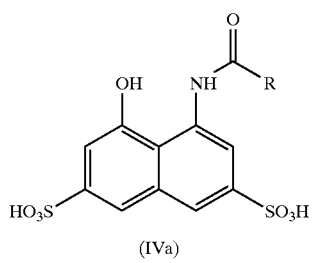

(IVa)

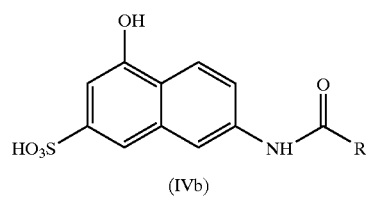

(IVb)

TABLE 1-continued

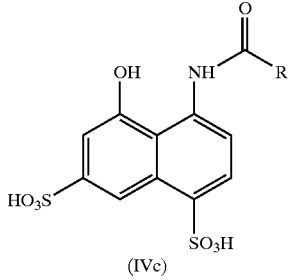

(IVc)

| Example | Naphthalene acid used | Anhydride used | —R |
|---|---|---|---|
| 6 | 1-amino-8-hydroxy-naphthalene-4,6-disulfonic acid | phthalic anhydride | (2-methylbenzoic acid COOH) |
| 7 | 3-amino-8-hydroxy-naphthalene-6-sulfonic acid | 4-tertiary-butyl-phthalic anhydride | (isomer mixture with t-Bu and COOH) |
| 8 | 1-amino-8-hydroxy-naphthalene-4,6-disulfonic acid | 4-tertiary-butyl-phthalic anhydride | (isomer mixture with t-Bu and COOH) |
| 9 | 1-amino-8-hydroxy-naphthalene-3,6-disulfonic acid | 3,6-dimethyl-phthalic anhydride | (2,3,6-trimethyl benzoic acid with COOH) |
| 10 | 3-amino-8-hydroxy-naphthalene-6-sulfonic acid | 3,6-dimethyl-phthalic anhydride | (2,3,6-trimethyl benzoic acid with COOH) |
| 11 | 1-amino-8-hydroxy-naphthalene-4,6-difulfonic acid | 3,6-dimethyl-phthalic anhydride | (2,3,6-trimethyl benzoic acid with COOH) |

TABLE 1-continued

| 12 | 1-amino-8-hydroxy-naphthalene-3,6-disulfonic acid | 3-methyl-phthalic anhydride | (structures: 2-methyl-6-methylbenzoic acid isomers) |
| 13 | 1-amino-8-hydroxy-naphthalene-3,6-disulfonic acid | 4-methyl-phthalic anhydride | (structures: methyl-substituted benzoic acid isomers) |
| 14 | 1-amino-8-hydroxy-naphthalene-3,6-disulfonic acid | 3,4,5,6-tetramethylphthalic anhydride | (structure: 2,3,4,5-tetramethylbenzoic acid) |
| 15 | 1-amino-8-hydroxy-naphthalene-3,6-disulfonic acid | naphthalene-2,3-dicarboxylic anhydride | (structure: 3-methyl-2-naphthoic acid) |
| 16 | 3-amino-8-hydroxy-naphthalene-6-sulfonic acid | naphthalene-2,3-dicarboxylic anhydride | (structure: 3-methyl-2-naphthoic acid) |
| 17 | 1-amino-8-hydroxy-naphthalene-4,6-disulfonic acid | naphthalene-2,3-dicarboxylic anhydride | (structure: 3-methyl-2-naphthoic acid) |
| 18 | 1-amino-8-hydroxy-naphthalene-3,6-disulfonic acid | naphthalene-1,2-dicarboxylic anhydride | (structures: methyl-naphthoic acid isomers) |
| 19 | 1-amino-8-hydroxy-naphthalene-3,6-disulfonic acid | 3-hydroxy-phthalic anhydride | (structures: hydroxy-methyl-benzoic acid isomers) |

TABLE 1-continued

| | | | |
|---|---|---|---|
| 20 | 1-amino-8-hydroxy-naphthalene-3,6-disulfonic acid | 4-carboxyphthalic anhydride | [structure: 2-methyl-5-carboxybenzoic acid (COOH at 1, CH3 at 2, COOH at 5)] + [structure: 2-methyl-4-carboxybenzoic acid] |
| 21 | 1-amino-8-hydroxy-naphthalene-3,6-disulfonic acid | 3-aminophthalic anhydride | [structure: 2-methyl-3-aminobenzoic acid] + [structure: 2-methyl-4-aminobenzoic acid] |
| 22 | 1-amino-8-hydroxy-naphthalene-3,6-disulfonic acid | 4-nitrophthalic anhydride | [structure: 2-methyl-5-nitrobenzoic acid] + [structure: 2-methyl-4-nitrobenzoic acid] |
| 23 | 1-amino-8-hydroxy-naphthalene-3,6-disulfonic acid | 3-chloro-phthalic anhydride | [structure: 2-methyl-3-chlorobenzoic acid] + [structure: 2-methyl-4-chlorobenzoic acid] |
| 24 | 1-amino-8-hydroxy-naphthalene-3,6-disulfonic acid | 4-bromophthalic anhydride | [structure: 2-methyl-5-bromobenzoic acid] + [structure: 2-methyl-4-bromobenzoic acid] |
| 25 | 3-amino-8-hydroxy-naphthalene-6-sulfonic acid | isatoic anhydride | [structure: 2-methylaniline] |
| 26 | 1-amino-8-hydroxy-naphthalene-4,6-disulfonic acid | isatoic anhydride | [structure: 2-methylaniline] |
| 27 | 3-amino-8-hydroxy-naphthalene-6-sulfonic acid | N-(methoxy-carbonylmethyl)-isatoic anhydride | [structure: methyl N-(2-methylphenyl)glycinate] |

TABLE 1-continued

| # | Coupling component | Isatoic anhydride | Structure |
|---|---|---|---|
| 28 | 1-amino-8-hydroxy-naphthalene-4,6-disulfonic acid | N-(methoxy-carbonyl-methyl)-isatoic anhydride | 2-methylphenyl-NH-CH$_2$-C(=O)-O-CH$_3$ |
| 29 | 1-amino-8-hydroxy-naphthalene-3,6-disulfonic acid | N-ethyl-isatoic anhydride | 2-methylphenyl-NH-C$_2$H$_5$ |
| 30 | 1-amino-8-hydroxy-naphthalene-3,6-disulfonic acid | N-benzylisatoic anhydride | phenyl-CH$_2$NH-(2-methylphenyl) |
| 31 | 1-amino-8-hydroxy-naphthalene-3,6-disulfonic acid | 6-methylisatoic anhydride | 2,3-dimethyl aniline (NH$_2$ with H$_3$C ortho) |
| 32 | 1-amino-8-hydroxy-naphthalene-3,6-disulfonic acid | 6-hydroxyisatoic anhydride | 3-amino-2-methylphenol |
| 33 | 1-amino-8-hydroxy-naphthalene-3,6-disulfonic acid | 4-carboxyisatoic anhydride | 3-amino-4-methylbenzoic acid |

Preparation of Azoxy Dyes According to the Invention

EXAMPLE 34

16.8 g of 2-methoxy-4-nitroaniline were precharged in 200 g of water and mixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 1. The pH was maintained at 8–9 by the simultaneous addition of 20 ml of 25% by weight sodium hydroxide solution. After the coupling reaction had ended, 100 g of 50% strength by weight sodium hydroxide solution were metered in. At 40–45° C. 47 g of 25% strength by weight glucose solution were gradually added dropwise with stirring. After the reaction had ended (TLC check), the dye was precipitated with 130 g of concentrated hydrochloric acid and isolated by filtration. The dye thus obtained dyes paper in a blue shade ($\lambda_{max}$=592 nm).

EXAMPLE 35

16.8 g of 2-methoxy-4-nitroaniline were precharged in 200 g of water and mixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 1. The pH was maintained at 8–9 by the simultaneous addition of 20 ml of 25% by weight sodium hydroxide solution. After the coupling reaction had ended, 20 g of 50% strength by weight sodium hydroxide solution were metered in. At 90° C. 135 g of 10% strength by weight glucose solution were gradually added dropwise with stirring. After the reaction had ended (TLC check), the dye was precipitated with 80 g of concentrated hydrochloric acid and isolated by filtration.

EXAMPLE 36

16.8 g of 2-methoxy-4-nitroaniline were precharged in 200 g of water and mixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 1. The pH was maintained at 8–9 by the simultaneous addition of 20 ml of 25% by weight sodium hydroxide solution. After the coupling reaction had ended, 100 g of 50% strength by weight sodium hydroxide solution were metered in. At 60° C. 44 g of 25% strength by weight glucose solution were gradually added dropwise with stirring. After the reaction had ended (TLC check), the dye was precipitated with 130 g of concentrated hydrochloric acid and isolated by filtration.

EXAMPLE 37

18.2 g of 5-nitroanthranilic acid were precharged in 290 g of water and mixed with 40 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 1. The pH was maintained at 8–9 by the simultaneous addition of 200 ml of 10% by weight sodium hydroxide solution. After the coupling reaction had ended, 40 g of 50% strength by weight sodium hydroxide solution were metered into the suspension. At 50° C. 45 ml of 10% strength by weight glucose solution were gradually added dropwise with stirring. After the reaction had ended (TLC check), the dye was precipitated with concentrated hydrochloric acid and isolated by filtration. The dye thus obtained dyes paper in blue shades ($\lambda_{max}$=556 nm).

EXAMPLE 38

16.8 g of 2-methoxy-4-nitroaniline were precharged in 200 g of water and mixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component was adjusted with sodium acetate to pH 3–4. The coupling component prepared in Example 2 was then added at 15–20° C. over 20 minutes while the pH was adjusted to 4–5 with 10% strength by weight sodium hydroxide solution. The monoazo dye was isolated by filtration. The moist presscake was introduced into 1000 g of water and admixed with 100 g of 50% strength by weight sodium hydroxide solution. At 60° C. 45 ml of 25% strength by weight glucose solution were gradually added dropwise with stirring. After the reaction had ended (TLC check), the dye was precipitated with 150 g of concentrated hydrochloric acid and isolated by filtration. The dye thus obtained dyes paper in reddish blue shades ($\lambda_{max}$=544 nm).

EXAMPLE 39

16.8 g of 2-methoxy-4-nitroaniline were precharged in 200 g of water and mixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 3. The pH was maintained at 8–9 by the simultaneous addition of 10% by weight sodium hydroxide solution. After the coupling reaction had ended, 15 g of 50% strength by weight sodium hydroxide solution were metered in. At 65° C. 115 ml of 15% strength by weight glucose solution were gradually added dropwise with stirring. After the reaction had ended (TLC check), the dye was precipitated with concentrated hydrochloric acid and isolated by filtration. The dye thus obtained dyes paper in blue shades ($\lambda_{max}$=590 nm).

EXAMPLE 40

16.8 g of 2-methoxy-4-nitroaniline were precharged in 200 g of water and mixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 5. The pH was maintained at 8–9 by the simultaneous addition of 20 ml of 25% by weight sodium hydroxide solution. After the coupling reaction had ended, 25 g of 50% strength by weight sodium hydroxide solution were metered in. At 60° C. 130 g of 10% strength by weight glucose solution were gradually added dropwise with stirring. After the reaction had ended (TLC check), the dye was precipitated with 130 g of concentrated hydrochloric acid and isolated by filtration. The dye thus obtained dyes paper in a blue shade ($\lambda_{max}$=584 nm).

Examples 34–40 were repeated to prepare the dyes of the general formulae Ia, Ib and Ic mentioned in Table 2. The choice of the best reduction conditions is adjusted to the nature of the nitroazo compound to be used and is easy to determine in preliminary experiments. The dyes thus obtained can be isolated by adding hydrochloric acid or dyed up on paper from the reaction suspension.

TABLE 2

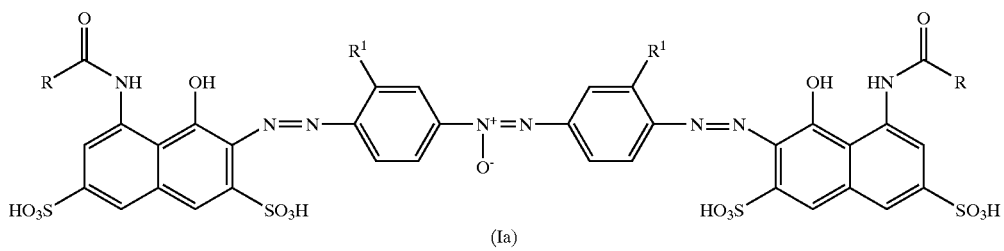

(Ia)

TABLE 2-continued
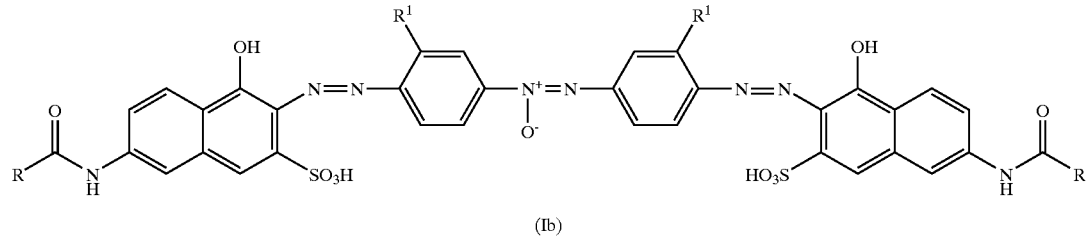
(Ib)
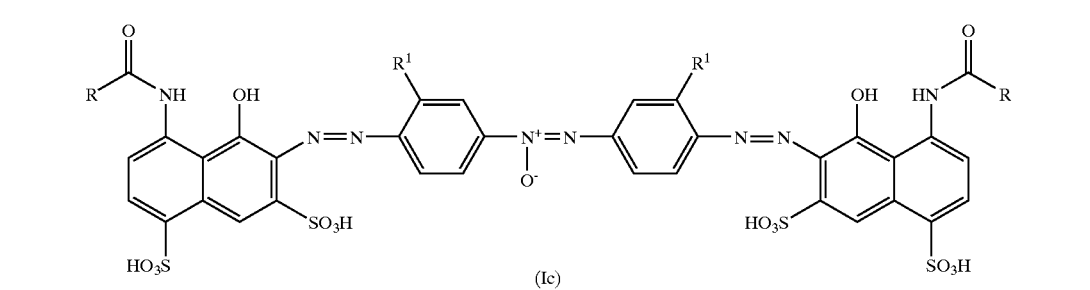
(Ic)
| Ex. | Diazo component | Coupling component from | Formula | R¹ | —R |
|---|---|---|---|---|---|
| 41 | 5-nitro-anthranilic acid | Ex. 5 | Ib | COOH | 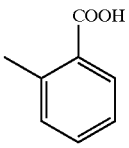 |
| 42 | 2-methoxy-4-nitro-aniline | Ex. 6 | Ic | OCH₃ | 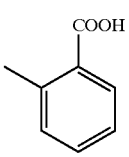 |
| 43 | 5-nitro-anthranilic acid | Ex. 6 | Ic | COOH | 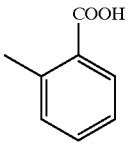 |
| 44 | 5-nitro-anthranilic acid | Ex. 3 | Ia | COOH | 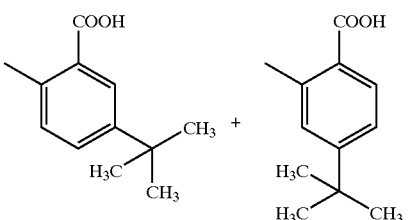 |
| 45 | 2-methoxy-4-nitro-aniline | Ex. 7 | Ib | OCH₃ | 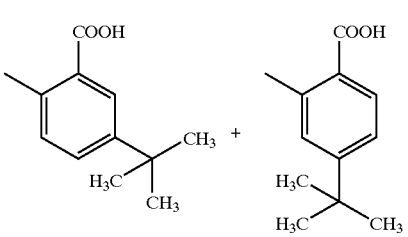 |

TABLE 2-continued
| | | | | | | |
|---|---|---|---|---|---|---|
| 46 | 5-nitro-anthranilic acid | Ex. 7 | Ib | COOH | 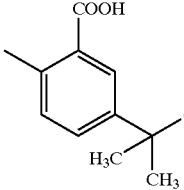 | 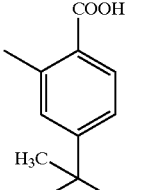 |
| 47 | 2-methoxy-4-nitro-aniline | Ex. 8 | Ic | OCH₃ | 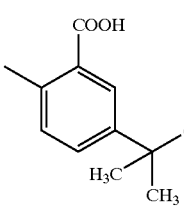 | 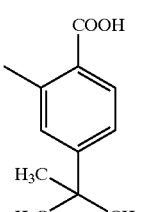 |
| 48 | 5-nitro-anthranilic acid | Ex. 8 | Ic | COOH | 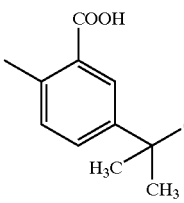 | 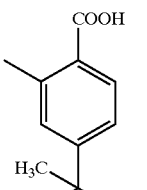 |
| 49 | 2-methoxy-4-nitro-aniline | Ex. 9 | Ia | OCH₃ | 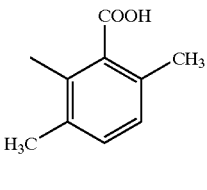 | |
| 50 | 5-nitro-anthranilic acid | Ex. 9 | Ia | COOH | 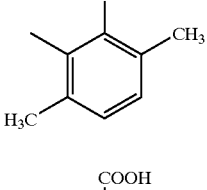 | |
| 51 | 2-methoxy-4-nitro-aniline | Ex. 10 | Ib | OCH₃ | 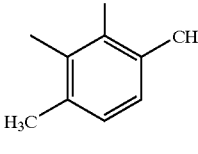 | |
| 52 | 2-methoxy-4-nitro-aniline | Ex. 11 | Ic | OCH₃ | 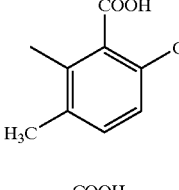 | |
| 53 | 2-methoxy-4-nitro-aniline | Ex. 12 | Ia | OCH₃ | 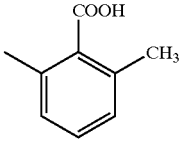 | 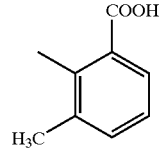 |

TABLE 2-continued
| 54 | 5-nitro-anthranilic acid | Ex. 12 | Ia | COOH | 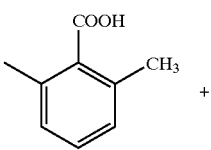 |
| 55 | 2-methoxy-4-nitro-aniline | Ex. 13 | Ia | OCH$_3$ | 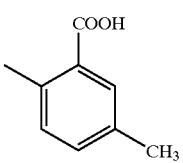 |
| 56 | 2-methoxy-4-nitro-aniline | Ex. 14 | Ia | OCH$_3$ | 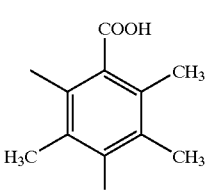 |
| 57 | 2-methoxy-4-nitro-aniline | Ex. 15 | Ia | OCH$_3$ | 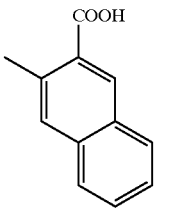 |
| 58 | 5-nitro-anthranilic acid | Ex. 15 | Ia | COOH | 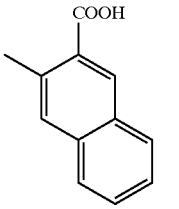 |
| 59 | 2-methoxy-4-nitro-aniline | Ex. 16 | Ib | OCH$_3$ | 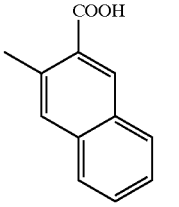 |
| 60 | 2-methoxy-4-nitro-aniline | Ex. 17 | Ic | OCH$_3$ | 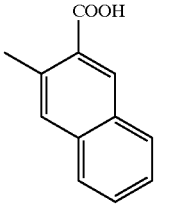 |

TABLE 2-continued
| | | | | | | |
|---|---|---|---|---|---|---|
| 61 | 2-methoxy-4-nitro-aniline | Ex. 18 | Ia | OCH₃ | 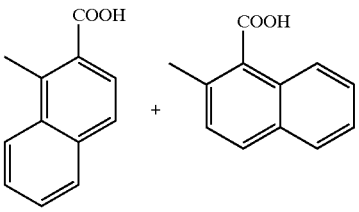 | |
| 62 | 2-methoxy-4-nitro-aniline | Ex. 19 | Ia | OCH₃ | 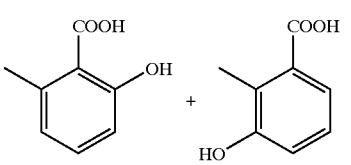 | |
| 63 | 2-methoxy-4-nitro-aniline | Ex. 20 | Ia | OCH₃ | 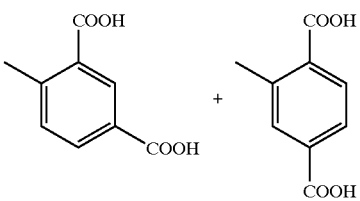 | |
| 64 | 2-methoxy-4-nitro-aniline | Ex. 21 | Ia | OCH₃ | 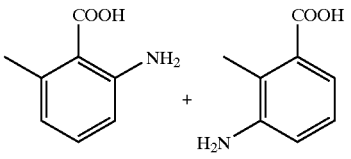 | |
| 65 | 2-methoxy-4-nitro-aniline | Ex. 22 | Ia | OCH₃ | 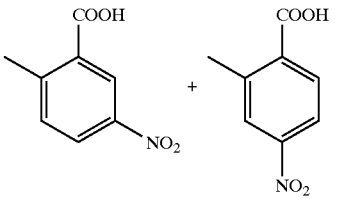 | |
| 66 | 2-methoxy-4-nitro-aniline | Ex. 23 | Ia | OCH₃ | 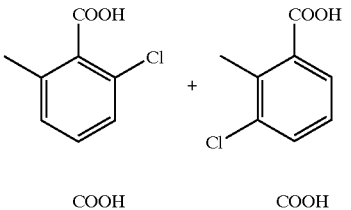 | |
| 67 | 2-methoxy-4-nitro-aniline | Ex. 24 | Ia | OCH₃ | 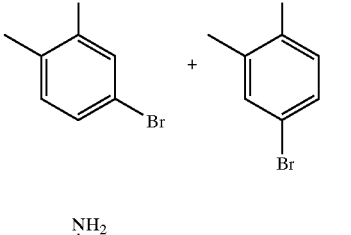 | |
| 68 | 5-nitro-anthranilic acid | Ex. 2 | Ia | COOH | 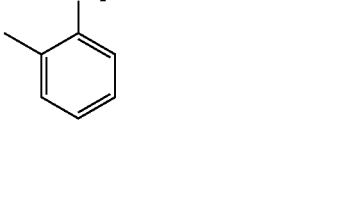 | |

TABLE 2-continued
| | | | | | |
|---|---|---|---|---|---|
| 69 | 2-methoxy-4-nitro-aniline | Ex. 25 | Ib | OCH$_3$ | 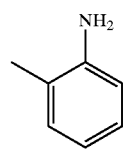 |
| 70 | 5-nitro-anthranilic acid | Ex. 25 | Ib | COOH | 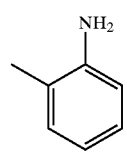 |
| 71 | 2-methoxy-4-nitro-aniline | Ex. 26 | Ic | OCH$_3$ | 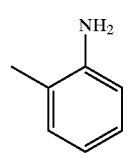 |
| 72 | 5-nitro-anthranilic acid | Ex. 26 | Ic | COOH | 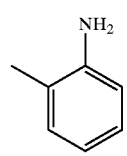 |
| 73 | 2-methoxy-4-nitro-aniline | Ex. 4 | Ia | OCH$_3$ | 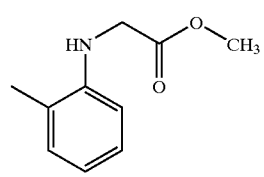 |
| 74 | 5-nitro-anthranilic acid | Ex. 4 | Ia | COOH | 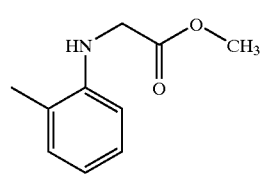 |
| 75 | 2-methoxy-4-nitro-aniline | Ex. 27 | Ib | OCH$_3$ | 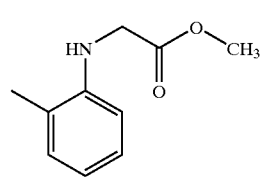 |
| 76 | 2-methoxy-4-nitro-aniline | Ex. 28 | Ic | OCH$_3$ | 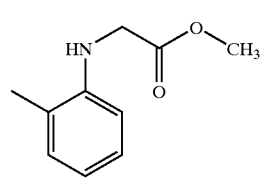 |
| 77 | 2-methoxy-4-nitro-aniline | Ex. 29 | Ia | OCH$_3$ | 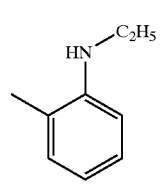 |

TABLE 2-continued

| 78 | 5-nitro-anthranilic acid | Ex. 29 | Ia | COOH | 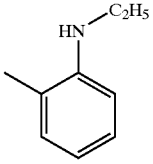 |
| --- | --- | --- | --- | --- | --- |
| 79 | 2-methoxy-4-nitro-aniline | Ex. 30 | Ia | OCH₃ | 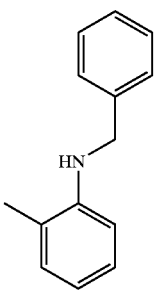 |
| 80 | 2-methoxy-4-nitro-aniline | Ex. 31 | Ia | OCH₃ | 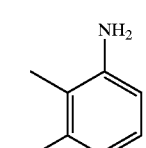 |
| 81 | 2-methoxy-4-nitro-aniline | Ex. 32 | Ia | OCH₃ | 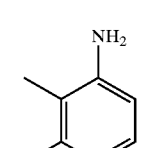 |
| 82 | 2-methoxy-4-nitro-aniline | Ex. 33 | Ia | OCH₃ | 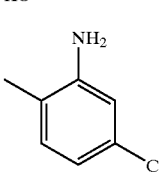 |

Synthesis of Copper Complexes According to Invention

Copper complexes are prepared according to methods known in principle:

The dealkylating coppering of o-hydroxy-o'-methoxy-azo dyes generally takes 6–12 hours of heating at 80–90° C. in an ammoniacal medium. Ammonia may be wholly or partly replaced with organic nitrogenous bases. Coppering can be performed starting from the isolated dyes or be carried out immediately following the reduction, in which case the copperless dyes are not isolated in between. If the copperless dye was isolated, both the moist presscake and the dried dye can be used. The ratio of copperless dye to singly coppered dye to doubly coppered dye depends on the amount of copper salt provided. The dyes thus prepared are partly precipitated with hydrochloric acid and partly dyed up on paper directly from the reaction solution. The dyes can be obtained as stable liquid formulations in the form of their salts (e.g., lithium, sodium, potassium; (optionally substituted) ammonium) by means of customary methods.

EXAMPLE 83

⅕ of the isolated dye prepared according to Example 34 was slurried up in 250 g of water and admixed with 5.5 g of diethanolamine and 0.75 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=598 nm).

EXAMPLE 84

⅕ of the isolated dye prepared according to Example 34 was slurried up in 250 g of water and admixed with 5.5 g of diethanolamine and 1.25 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=600 nm).

EXAMPLE 85

⅕ of the isolated dye prepared according to Example 34 was slurried up in 250 g of water and admixed with 5.5 g of diethanolamine and 1.75 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=602 nm).

EXAMPLE 86

⅕ of the isolated dye prepared according to Example 34 was slurried up in 250 g of water and admixed with 5.5 g of diethanolamine and 2.25 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=606 nm).

EXAMPLE 87

⅕ of the isolated dye prepared according to Example 34 was slurried up in 250 g of water and admixed with 5.5 g of diethanolamine and 2.75 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=610 nm).

EXAMPLE 88

⅕ of the isolated dye prepared according to Example 34 was slurried up in 250 g of water and admixed with 5.5 g of diethanolamine and 3.25 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=614 nm).

EXAMPLE 89

⅕ of the isolated dye prepared according to Example 34 was slurried up in 250 g of water and admixed with 5.5 g of diethanolamine and 3.75 g of copper(II) sulfate pentahydrate. The pH was then adjusted to 8.5–9 using 10% strength by weight sodium hydroxide-solution. The reaction mixture was then stirred at that pH and 90° C. for 7 h. The dye thus obtained dyes paper in a blue shade ($\lambda_{max}$=618 nm).

EXAMPLE 90

⅕ of the isolated dye prepared according to Example 34 was slurried up in 250 g of water and admixed with 5.5 g of diethanolamine and 4.25 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=618 nm).

EXAMPLE 91

⅕ of the isolated dye prepared according to Example 34 was slurried up in 250 g of water and admixed with 5.5 g of diethanolamine and 4.5 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=624 nm).

EXAMPLE 92

⅕ of the isolated dye prepared according to Example 34 was slurried up in 250 g of water and admixed with 5.5 g of diethanolamine and 5 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=626 nm).

EXAMPLE 93

The dyes prepared in Examples 34, 83, 84, 85, 86, 87, 88, 89, 90, 91 and 92 are pulp-dyed up in a conventional manner onto various papery material models to ⅙ standard depth of shade. It is found that the hue of the dyes becomes greener in the stated order and that the lightfastness increases.

EXAMPLE 94

⅕ of the reaction suspension of the dye prepared according to Example 34 was diluted with 170 g of water and admixed with 5.5 g of diethanolamine and 2.75 g of copper (II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=602 nm).

EXAMPLE 95

⅕ of the reaction suspension of the dye prepared according to Example 34 was diluted with 170 g of water and admixed with 5.5 g of diethanolamine and 5.2 g of copper (II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=608 nm).

EXAMPLE 96

⅗ of the isolated dye prepared according to Example 34 was slurried up in 750 g of water and admixed with 16.5 g of diethanolamine and 7.8 g of copper acetate. The pH was then adjusted to 8.5–9 using 10% strength by weight sodium hydroxide solution. The reaction mixture was then stirred at that pH and 80° C. for 8 h. The dye thus obtained dyes paper in a blue shade ($\lambda_{max}$=614 nm).

EXAMPLE 97

⅕ of the isolated dye prepared according to Example 34 was slurried up in 155 g of water and admixed with 5.5 g of diethanolamine and 2.6 g of copper acetate. The pH was then adjusted to 8.5–9 using 10% strength by weight sodium hydroxide solution. The reaction mixture was then stirred at that pH and 80° C. for 8 h. The dye thus obtained dyes paper in a blue shade ($\lambda_{max}$=612 nm).

EXAMPLE 98

⅕ of the reaction suspension of the dye prepared according to Example 39 was diluted with 140 g of water and admixed with 5.5 g of diethanolamine and 6 g of copper(II) sulfate pentahydrate. The reaction mixture was then stirred at 85° C. for 6 h. The dye thus obtained dyes paper in a blue shade ($\lambda_{max}$=620 nm).

EXAMPLE 99

⅕ of the reaction suspension of the dye prepared according to Example 39 was diluted with 140 g of water and admixed with 18 g of 25% strength ammonia and 6 g of copper(II) sulfate pentahydrate. The reaction mixture was then stirred at 85° C. for 6 h. The dye thus obtained dyes paper in a blue shade ($\lambda_{max}$=604 nm).

EXAMPLE 100

⅕ of the reaction suspension of the dye prepared according to Example 40 was diluted with 140 g of water and admixed with 5.5 g of diethanolamine and 6 g of copper(II) sulfate pentahydrate. The reaction mixture was then stirred at 85° C. for 6 h. The dye thus obtained dyes paper in a blue shade ($\lambda_{max}$=588 nm).

EXAMPLE 101

⅕ of the reaction suspension of the dye prepared according to Example 40 was diluted with 140 g of water and admixed with 18 g of 25% strength ammonia and 6 g of copper(II) sulfate pentahydrate. The reaction mixture was then stirred at 85° C. for 6 h. The dye thus obtained dyes paper in a blue shade ($\lambda_{max}$=586 nm).

EXAMPLE 102

⅖ of the isolated dye prepared according to Example 38 was slurried up in 365 g of water and admixed with 11 g of diethanolamine and 10 g of copper(II) sulfate pentahydrate. The reaction mixture was then stirred at 85° C. for 6 h. The dye thus obtained dyes paper in a blue shade.

Half the batch was bottled as reaction suspension. ($\lambda_{max}$=564 nm).

The other half of the batch was admixed with 25 g of concentrated hydrochloric acid and the precipitated dye was filtered off, washed with sodium chloride solution and then dried under reduced pressure at 50–60° C. ($\lambda_{max}$=546 nm).

EXAMPLE 103

⅖ of the isolated dye prepared according to Example 38 was slurried up in 365 g of water and admixed with 36 g of 25% strength ammonia and 10 g of copper(II) sulfate pentahydrate. The reaction mixture was then stirred at 85° C. for 6 h. The dye thus obtained dyes paper in a blue shade. Half the batch was bottled as reaction suspension. ($\lambda_{max}$=564 nm).

The other half of the batch was admixed with 25 g of concentrated hydrochloric acid and the precipitated dye was filtered off, washed with sodium chloride solution and then dried under reduced pressure at 50–60° C. ($\lambda_{max}$=546 nm).

Examples 83–103 were repeated to convert the azoxy dyes of Examples 41–82, depending on the conditions recited in Table 3, into dye mixtures comprising the uncomplexed, singly copper-complexed and doubly copper-complexed azoxy dye, which dye paper uniformly and have good fastnesses. The choice of the best reaction conditions (pH, temperature, reaction time) is adjusted to the nature of the dye to be used and is easily determined in preliminary experiments. The dyes thus obtained can be isolated by adding an acid or be dyed up on paper from the reaction suspension.

TABLE 3

| Example | Azoxy dye | Moles of Cu salt per mole of dye |
|---|---|---|
| 104 | Example 42 | 1 |
| 105 | Example 42 | 2 |
| 106 | Example 45 | 1 |
| 107 | Example 45 | 1.5 |
| 108 | Example 45 | 2 |
| 109 | Example 47 | 2 |
| 110 | Example 49 | 2 |
| 111 | Example 51 | 2 |
| 112 | Example 52 | 2 |
| 113 | Example 53 | 2 |
| 114 | Example 55 | 2 |
| 115 | Example 56 | 2 |
| 116 | Example 57 | 2 |
| 117 | Example 59 | 2 |
| 118 | Example 61 | 2 |
| 119 | Example 62 | 2 |
| 120 | Example 66 | 2 |
| 121 | Example 69 | 1 |

TABLE 3-continued

| Example | Azoxy dye | Moles of Cu salt per mole of dye |
|---|---|---|
| 122 | Example 69 | 2 |
| 123 | Example 71 | 2 |
| 124 | Example 73 | 1 |
| 125 | Example 73 | 2 |
| 126 | Example 75 | 2 |
| 127 | Example 77 | 2 |
| 128 | Example 80 | 2 |

The copper complexes of water-soluble o-hydroxy-o'-carboxy-azo dyes are formed under mild conditions at room temperature in the weakly acidic or ammoniacal pH range. On an industrial scale, elevated temperatures are used for solubility reasons. When the metallization is carried out in the acidic range, the liberated mineral acid is buffered off with sodium acetate. With this class of compounds too the coppering can be conducted starting from the isolated dyes or be carried out directly following the reduction, in which case the copperless dyes are not intermediately isolated. If the copperless dye was isolated, both the moist presscake and the dried dye can be used. The ratio of copperless dye to singly coppered dye to doubly coppered dye depends on the amount of copper salt provided. The dyes thus prepared are partly precipitated with hydrochloric acid and partly dyed up on paper directly from the reaction solution. The dyes can be obtained as stable liquid formulations in the form of their salts (e.g., lithium, sodium, potassium; (optionally substituted) ammonium) by means of customary methods.

EXAMPLE 129

⅕ of the isolated dye prepared according to Example 37 was slurried up in 150 g of water and admixed with 10 g of diethanolamine and 5 g of copper(II) sulfate pentahydrate. The pH was then adjusted to 10 using 10% strength by weight sodium hydroxide solution. The reaction mixture was then stirred at 90° C. for 8 h. The dye thus obtained dyes paper in a blue shade ($\lambda_{max}$=574 nm).

EXAMPLE 130

⅕ of the isolated dye prepared according to Example 37 was slurried up in 150 g of water and admixed with 4.5 g of 25% 4 strength ammonia and 5 g of copper(II) sulfate pentahydrate. The pH was then adjusted to 9.5 using 10% strength by weight sodium hydroxide solution. The reaction mixture was then stirred at 90° C. for 8 h. The dye thus obtained dyes paper in a blue shade ($\lambda_{max}$=576 nm).

EXAMPLE 131

⅕ of the isolated dye prepared according to Example 37 was slurried up in 150 g of water and admixed with 5 g of copper(II) sulfate pentahydrate. The pH was then adjusted to 4 using 10% strength by weight sodium hydroxide solution. The reaction mixture was then stirred at 90° C. for 8 h. The dye thus obtained dyes paper in a blue shade ($\lambda_{max}$=602 nm).

Examples 129–131 were repeated to convert the azoxy dyes of Examples 41–82, depending on the conditions recited in Table 4, into dye mixtures comprising the uncomplexed, singly copper-complexed and doubly copper-complexed azoxy dye; which dye paper uniformly and have good fastnesses. The choice of the best reaction conditions (pH, temperature, reacion time) is adjusted to the nature of the dye to be used and is easily determined in preliminary experiments. The dyes thus obtained can be isolated by adding an acid or be dyed up on paper from the reaction suspension.

TABLE 4

| Example | Azoxy dye | Moles of Cu salt per mole of dye |
|---------|-----------|-----------------------------------|
| 132 | Example 37 | 1 |
| 133 | Example 41 | 1 |
| 134 | Example 41 | 2 |
| 135 | Example 43 | 1 |
| 136 | Example 43 | 2 |
| 137 | Example 44 | 2 |
| 138 | Example 46 | 2 |
| 139 | Example 48 | 2 |
| 140 | Example 50 | 2 |
| 141 | Example 54 | 2 |
| 142 | Example 58 | 2 |
| 143 | Example 68 | 1 |
| 144 | Example 68 | 1.5 |
| 145 | Example 68 | 2 |
| 146 | Example 70 | 2 |
| 147 | Example 72 | 2 |
| 148 | Example 74 | 2 |
| 149 | Example 78 | 2 |

EXAMPLE 150

16.8 g of 2-methoxy-4-nitroaniline were precharged in 200 g of water and admixed with 30 g of concentrated hydrochloric acid. 32 ml of 23% strength by weight sodium nitrite solution were then added at 0–10° C. over 30 minutes. After 2 h excess nitrite was destroyed with amidosulfonic acid and the diazo component thus prepared was added at 15–20° C. over 20 minutes to the coupling component prepared in Example 1. The pH was maintained at 8–9 by the simultaneous addition of 20 ml of 25% strength by weight sodium hydroxide solution. After the coupling reaction had ended, 75 g of 50% strength by weight sodium hydroxide solution were metered in. At 40–45° C. 47.5 g of 25% strength by weight glucose solution were gradually added dropwise with stirring. After the reaction had ended (TLC check), the dye was adjusted with 79 g of concentrated hydrochloric acid and stirred at 60° C. for 6 h. 19 g of concentrated hydrochloric acid were then added to adjust the pH to 2.2 and, after cooling of the suspension, the dye was isolated by filtration. The dye thus obtained of the formula

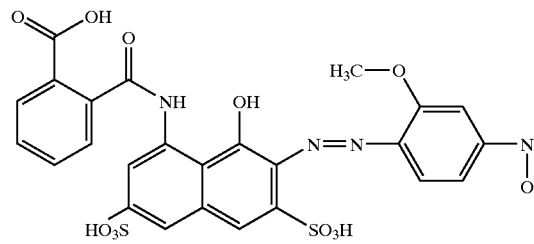
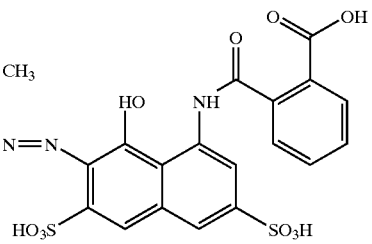

dyes paper in a blue shade ($\lambda_{max}$=596 nm).

EXAMPLE 151

⅕ of the isolated dye prepared according to Example 150 was slurried up in 155 g of water and admixed with 5.5 g of diethanolamine and 2.25 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=606 nm).

EXAMPLE 152

⅕ of the isolated dye prepared according to Example 150 was slurried up in 155 g of water and admixed with 5.5 g of diethanolamine and 3.25 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=618 nm).

EXAMPLE 153

⅖ of the isolated dye prepared according to Example 150 was slurried up in 310 g of water and admixed with 11 g of diethanolamine and 8.5 g of copper(II) sulfate pentahydrate. The pH was then adjusted to 8.5–9 using 10% strength by weight sodium hydroxide solution. The reaction mixture was then stirred at that pH and 90° C. for 7 h. The dye thus obtained dyes paper in a blue shade ($\lambda_{max}$=626 nm).

EXAMPLE 154

16.8 g of 2-methoxy-4-nitroaniline were precharged in 150 g of water and admixed with 30 g of concentrated hydrochloric acid. 32 ml of a 23% strength by weight sodium nitrite solution were then added at 0–10° C. over 30 minutes. After 2 h excess nitrite was destroyed with amidosulfonic acid and the diazo component thus prepared was added at 15–20° C. over 30 minutes to the coupling component prepared in Example 1. The pH was maintained at about 9 by the simultaneous addition of 20 ml of 25% strength by weight sodium hydroxide solution. After the coupling reaction had ended, 40 g of 50% strength by weight sodium hydroxide solution were metered in. At 50–55° C. 12.3 g of glucose were added a little at a time. After the reaction had ended (TLC check) the pH was adjusted to 8 by addition of 33 g of concentrated hydrochloric acid and the reaction mixture was stirred at 90° C. for 2 h. At that point, amide cleavage was complete. After cooling to room temperature the pH was adjusted to 8 by addition of 5 g of 50% strength by weight sodium hydroxide solution and the dye was isolated by filtration. The dye thus obtained dyes paper in a blue shade ($\lambda_{max}$=598 nm).

EXAMPLE 155

⅕ of the isolated dye prepared acording to Example 154 was slurried up in 110 g of water and admixed with 3.7 g of ethanolamine. 2.25 g of copper(II) sulfate pentahydrate dissolved in 25 g of water were added at 50° C. and the reaction mixture was stirred at 90° C. and pH 8.5–9.5 for 7 h. The dye mixture thus obtained dyes paper in a blue shade ($\lambda_{max}$=606 nm).

EXAMPLE 156

⅕ of the isolated dye prepared acording to Example 154 was slurried up in 97 g of water by addition of 13 g of urea.

2.25 g of copper(II) sulfate pentahydrate dissolved in 25 g of water were added at 50° C. and the reaction mixture was stirred at 90° C. and pH 8.5–9.5 for 7 h. The dye mixture thus obtained dyes paper in a blue shade ($\lambda_{max}$=606 nm).

EXAMPLE 157

⅕ of the isolated dye prepared acording to Example 154 was slurried up in 110 g of water and admixed with 3.7 g of ethanolamine. 2.75 g of copper(II) sulfate pentahydrate dissolved in 25 g of water were added at 50° C. and the reaction mixture was stirred at 90° C. and pH 8.5–9.5 for 7 h. The dye mixture thus obtained dyes paper in a blue shade ($\lambda_{max}$=606 nm).

EXAMPLE 158

⅕ of the isolated dye prepared acording to Example 154 was slurried up in 97 g of water by addition of 13 g of urea and admixed with 3.7 g of ethanolamine. 2.75 g of copper (II) sulfate pentahydrate dissolved in 25 g of water were added at 50° C. and the reaction mixture was stirred at 90° C. and pH 8.5–9.5 for 7 h. The dye mixture thus obtained dyes paper in a blue shade ($\lambda_{max}$=606 nm).

We claim:
1. A process for preparing copper complex dyes of the formula IX, or mixtures thereof:

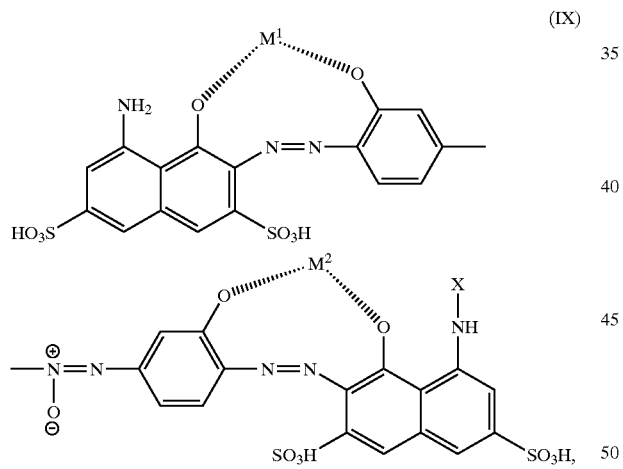

(IX)

wherein at least one of $M^1$ and $M^2$ is copper (II) and any which is not is hydrogen or methyl, and X is hydrogen, which comprises:

(1) preparing an azoxy dye of the formula

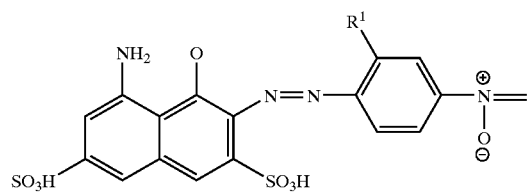

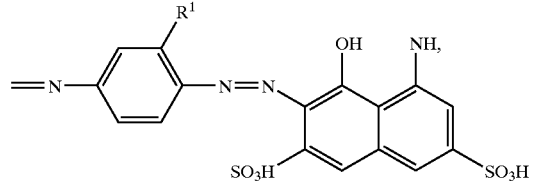

wherein $R^1$ is selected from the group consisting of methoxy, hydroxyl and carboxyl, by a process which comprises coupling a coupling component of the formula IV

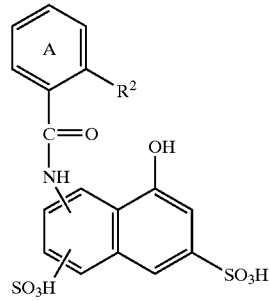

(IV)

wherein $R^2$ is selected from the group consisting of carboxyl, amino, $C_1$–$C_4$-alkylamino, allylamino, benzylamino and methoxycarbonylmethylamino, and the phenyl rings A may additionally be substituted by $C_1$–$C_8$-alkyl, unsubstituted or methyl- or halogen-substituted phenyl, hydroxyl, amino, nitro, halogen, carboxyl, N-benzylcarbamoyl, unsubstituted or nitro-, halogen-, $C_1$–$C_4$-alkoxy- or acetoxy-substituted phenylcarbamoyl and naphthylcarbamoyl or be benzofused,
with nitroaniline of the formula V

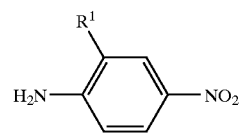

reducing the resultant nitro monoazo dye, and deacylating in aqueous solution at pH<9; and
(2) reacting the dye obtained in (1) with at least 0.1 mol equivalent of a copper donor.

2. A process for preparing copper complex dyes as claimed in claim 1, wherein $M^1$ and $M^2$ are copper (II).

3. A process for preparing copper complex dyes as claimed in claim 1, wherein $R^1$ is methoxy.

4. A process for preparing copper complex dyes as claimed in claim 1, wherein the phenyl rings A are unsubstituted or $C_1$–$C_4$-alkyl-substituted.

5. A process for preparing copper complex dyes as claimed in claim 1, wherein each $R^2$ is carboxyl.

6. A process for preparing copper complex dyes as claimed in claim 1, wherein the dye obtained in (1) is reacted with 0.1–2 mol copper donor per mol of dye.

7. A process for preparing copper complex dyes as claimed in claim 1, wherein the dye obtained in (1) is reacted with 0.5–1.7 mol copper donor per mol of dye.

8. A process for preparing copper complex dyes as claimed in claim 1, wherein the copper donors are salts which contain the copper as cation.

9. A process for preparing copper complex dyes of the formula IX, or mixtures thereof:

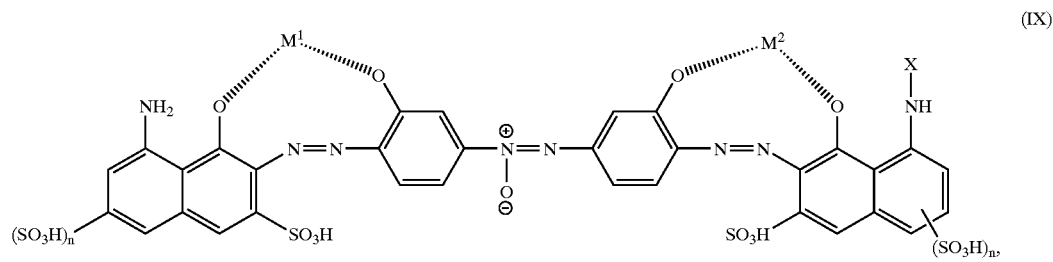

wherein at least one of $M^1$ and $M^2$ is copper (II) and any which is not is hydrogen or methyl, and X is hydrogen, which comprises:

(1) preparing an azoxy dye of the formula

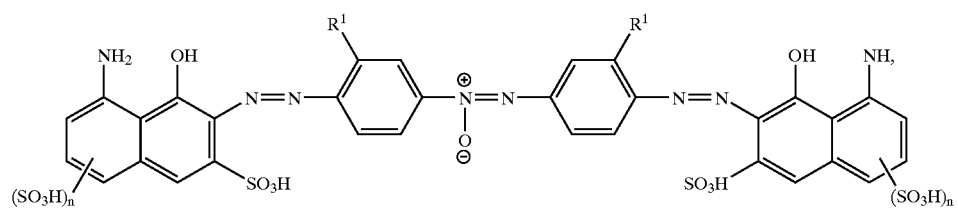

wherein $R^1$ is selected from the group consisting of methoxy, hydroxyl and carboxyl, by a process which comprises coupling a coupling component of the formula IV

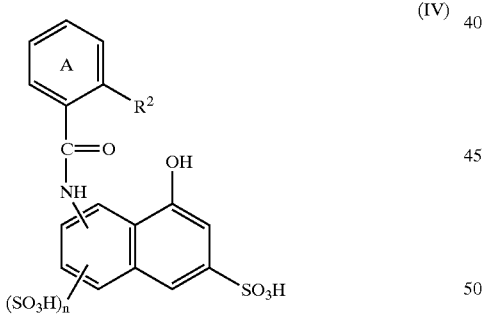

wherein n is 1, and $R^2$ is selected from the group consisting of carboxyl, amino, $C_1$–$C_4$-alkylamino, allylamino, benzylamino and methoxycarbonylmethylamino, and the phenyl rings A may additionally be substituted by $C_1$–$C_8$-alkyl, unsubstituted or methyl- or halogen-substituted phenyl, hydroxyl, amino, nitro, halogen, carboxyl, N-benzylcarbamoyl, unsubstituted or nitro-, halogen-, $C_1$–$C_4$-alkoxy- or acetoxy-substituted phenylcarbamoyl and naphthylcarbamoyl or be benzofused, with nitroaniline of the formula V

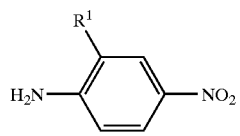

reducing the resultant nitro monoazo dye, and deacylating in aqueous solution at pH<9; and (2) reacting the dye obtained in (1) with at least 0.1 mol equivalent of a copper donor.

10. A process for preparing azoxy dyes of the formula

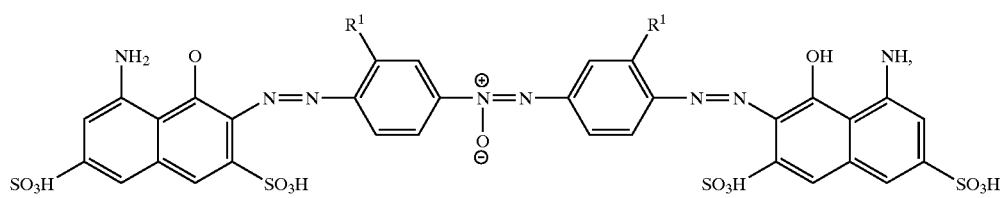

where $R^1$ is selected from the group consisting of methoxy, hydroxyl and carboxyl, which comprises coupling a coupling component of the formula IV

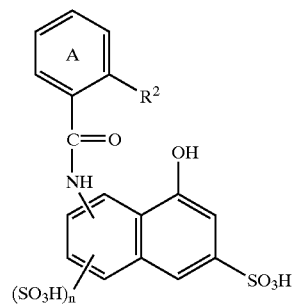

(IV)

with nitroaniline of the formula V

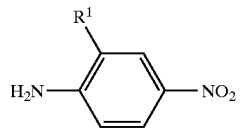

wherein $R^2$ is selected from the group consisting of carboxyl, amino, $C_1$–$C_4$-alkylamino, allylamino, benzylamino and methoxycarbonylmethylamino, and the phenyl rings A may additionally be substituted by $C_1$–$C_8$-alkyl, unsubstituted or methyl- or halogen-substituted phenyl, hydroxyl, amino, nitro, halogen, carboxyl, N-benzylcarbamoyl, unsubstituted or nitro-, halogen-, $C_1$–$C_4$-alkoxy- or acetoxy-substituted phenylcarbamoyl and naphthylcarbamoyl or be benzofused, reducing the resultant nitro monoazo dye, and deacylating in aqueous solution at pH<9.

* * * * *